June 10, 1930.  E. W. DAVIS  1,762,548
JOINT
Filed Nov. 27, 1925
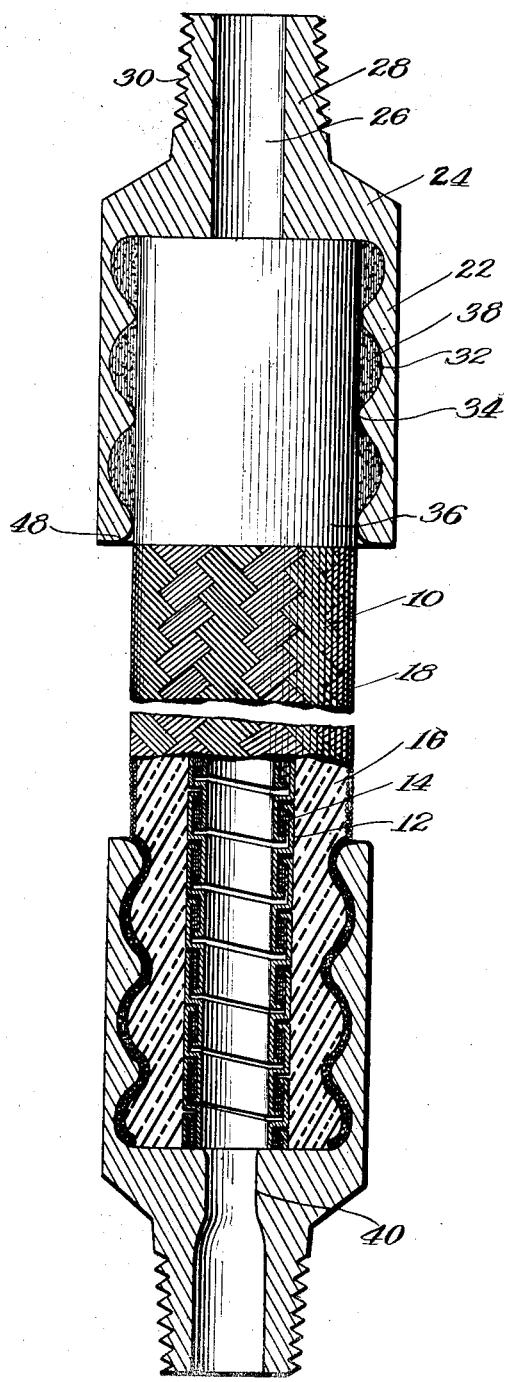
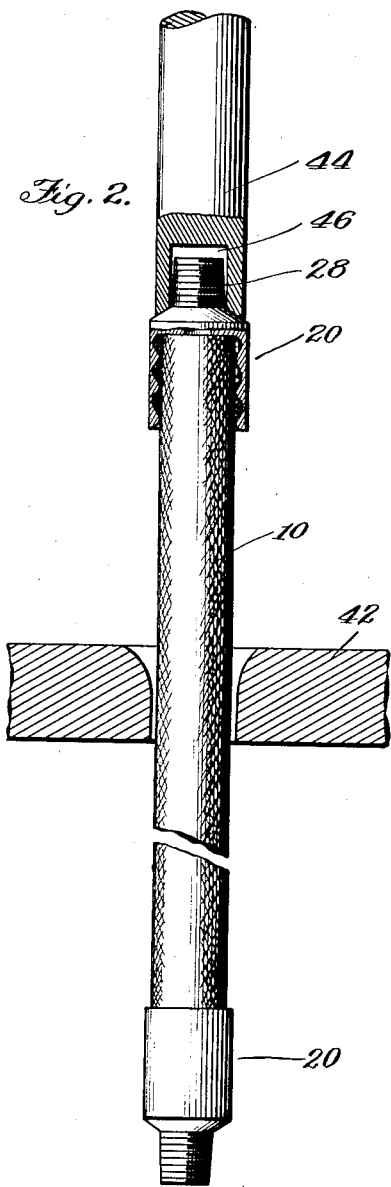
Inventor
Ernest W. Davis.
By Pierce and Sweet
Attys.

Patented June 10, 1930

1,762,548

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF ILLINOIS

JOINT

Application filed November 27, 1925. Serial No. 71,521.

My invention relates to conductors and more specifically to an improved structure for forming a firm and permanent union between a flexible tube and a metal terminal or the like. While the joint union disclosed is particularly intended for extremely high pressures, it will be obvious that its suitability for such service does not necessarily diminish its availability for other uses.

Among the objects and advantages of the invention may be enumerated:

First, the formation of a union joining a flexible tube and a terminal, and having strength both as to a seal against leakage and as to mechanical resistance to tension or twist comparable to or even greater than the strength of the conduit itself.

Second, the rapid and convenient assembly of such joints in such a way that quantity production is possible without impairing the quality of the product.

Further objects and advantages of the invention will become apparent as the description proceeds.

In the accompanying drawings:

Figure 1 is a longitudinal section through the structure according to the invention, with the upper terminal in assembled position previous to deformation, and the lower terminal completed; and Figure 2 is a diagrammatic view indicating the method of assembling the parts.

In the embodiment of the invention selected for illustration, I have illustrated a conventional flexible high pressure conduit 10 comprising the inter-locked spiral metal strip 12 forming a substantially continuous wall with the joints therein sealed by the packing 14. Outside this first wall is an intermediate sheath 16 of rubber or rubber composition, or the like. Finally, there is an outer sheath 18 of close woven metal wires constituting a fabric-like covering of great strength and material hardness to resist abrasion and rough handling. While it materially contributes to the tensile strength of the whole tube, the wire sheath will yield locally enough to permit the plastic distortion of the outer wall set forth hereinafter.

According to the invention, the terminal 20 comprises a sleeve 22 having one end open and the other end shouldered at 24 with a central bore 26 passing through the shoulder and through the extension 28 which is suitably adapted, as by pipe threads 30 on the exterior thereof, for attachment to other elements.

The inner surface of the sleeve 22 is provided with a plurality of annular grooves or pockets 32 separated by intervening ridges 34. In assembling a joint according to the invention, the portion of the tube received within the sleeve 22 is first painted or otherwise coated with a solution of raw rubber dissolved in naphtha, to completely plug and fill the interstices in the outer sheath 18, as indicated at 36 at the upper end of Figure 1. The annular grooves 32 are also completely filled with a cementing compound 38. In practice I have found that asphaltum of a grade having a melting point of approximately 300° Fahrenheit produces excellent results. A suitable lump of this material may be dropped into the sleeve and melted into the grooves by inserting a hot reamer or plunger. This leaves the inner surface substantially smooth and uniform and with only sufficient clearance to permit the easy insertion of the end of the conduit.

The next step in the process is to deform the material of the terminal 20 from the shape at the top of Figure 1 to that at the bottom. This is done by forcing it through a solid die under power so that the metal is forced to adjust itself. In passing through the die, the forces generated are so great that the metal acts as a more or less plastic material and flows a little, decreasing in outer diameter, and increasing slightly both in the thickness of the wall and in the length of the tube 22. When this squeeze occurs, the greater part of the cementing material 38 is forced out at the end of the tube, but a film of it remains, very intimately intermingled and united with the wire fabric 18 and its previous rubber filling. I believe that, on account of the greater structural strength of the asphaltum compared with the rubber, the rubber is materially compressed and jammed in, into the inner layers of wires in the fabric. After passing through the die, as correspondingly shown at the bottom of Figure 1, the outer diameter of the sleeve 22 has been materially decreased, and a slight decrease in the diameter of the inner end of the bore 26, as shown at 40, evidences the power with which the parts have been forced together. The intermediate sheath 16 being of much less rigidity than the metal sleeve will tend to bulge out between the ridges 34 as they bite into it, thereby completely filling the grooves and jamming the wire fabric hard up against the surface of the metal. This is evidenced by the fact that in the finished joint the outer diameter of the wire fabric in the bottoms of the grooves is greater than the original outer diameter of the conduit.

In assembling tubes according to the invention with a terminal at each end, the tube may be passed through the die 42 from either direction to put on the first terminal. The opposite end is then thrust up through the die from below, the second terminal set in place and the parts forced back through the die by suitable means such as the plunger 44 having a central countersink 46 to receive the extension 28 and avoid injuring it.

I have found that the assembled conduit and terminals have a hydraulic strength at the joint substantially as great as the hydraulic strength of the conduit itself. By rounding the edge of the sleeve at 48 on the outer side of the last ridge 34, the conduit is protected against any extremely sharp bend where it leaves the sleeve, that might tend to tear the wire fabric 18 and eventually cause a rupture at this point.

Without further elaboration the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. A permanent tubular joint comprising a tube and a terminal, said tube comprising an inner flexible tube formed of a spiral strip of metal with a packing sealing the spiral joint, a sheath of rubber composition, and an outer sheath of woven wire, said tube as a whole being flexible but substantially non-extensible and capable of withstanding high internal pressures, said terminal comprising a corrugated sleeve receiving the tube end, said corrugations indenting said tube sheaths, said sheaths inside the sleeve having annular protuberances of greater diameter than the original diameter of the undeformed tube, the woven wire sheath inside the sleeve being impregnated with rubber, the opposing surfaces of sleeve and tube being cemented together by a thin smear of asphaltum, the end of said sleeve on the tube terminating in an outward flare merging into said corrugations, and the other end carrying a threaded extension having an axial bore in alignment with the tube axis.

2. A permanent tubular joint comprising a tube and a terminal, said tube comprising an inner flexible tube formed of a spiral strip of metal with a packing sealing the spiral joint, a sheath of flexible composition, and an outer sheath of woven wire, said tube as a whole being flexible but substantially non-extensible and capable of withstanding high internal pressures, said terminal comprising a corrugated sleeve receiving the tube end, said corrugations indenting said tube sheaths, said sheaths inside the sleeve having annular protuberances between the corrugations closely fitting them, the woven wire sheath inside the sleeve being impregnated with a filler, the opposing surfaces of sleeve and tube being cemented together by a thin smear of a cement, the end of said sleeve on the tube terminating in an outward flare merging into said corrugations, and the other end having an axial bore in alignment with the tube axis.

3. A permanent tubular joint comprising a tube and a terminal, said tube as a whole being flexible but substantially non-extensible and capable of withstanding high internal pressures, the wall of said tube being slightly plastic on the outside, said terminal comprising a corrugated sleeve receiving the tube end, said corrugations being imbedded in said tube wall, said wall inside the sleeve having annular protuberances between the corrugations, the opposing surfaces of sleeve and tube being cemented together by a thin smear of a cement.

In witness whereof, I hereunto subscribe my name this 20th day of November, 1925.

ERNEST W. DAVIS.